US011410007B2

(12) United States Patent
Bauer et al.

(10) Patent No.: US 11,410,007 B2
(45) Date of Patent: Aug. 9, 2022

(54) DURABLE RFID PRINTED FABRIC LABELS

(71) Applicant: AVERY DENNISON RETAIL INFORMATION SERVICES LLC, Mentor, OH (US)

(72) Inventors: Richard K. Bauer, Beavercreek, OH (US); Rishikesh K. Bharadwaj, Temple City, CA (US)

(73) Assignee: Avery Dennison Retail Information Services LLC., Mentor, OH (US)

( * ) Notice: Subject to any disclaimer, the term of this patent is extended or adjusted under 35 U.S.C. 154(b) by 0 days.

(21) Appl. No.: 16/741,126

(22) Filed: Jan. 13, 2020

(65) Prior Publication Data

US 2020/0151527 A1      May 14, 2020

Related U.S. Application Data

(62) Division of application No. 15/680,364, filed on Aug. 18, 2017, now Pat. No. 10,534,988.

(51) Int. Cl.
*G06K 19/02* (2006.01)
*G09F 3/00* (2006.01)
(Continued)

(52) U.S. Cl.
CPC ..... *G06K 19/027* (2013.01); *G06K 19/07749* (2013.01); *G08B 13/2434* (2013.01);
(Continued)

(58) Field of Classification Search
CPC ....................... H01L 2924/00; G06K 19/07749
(Continued)

(56) References Cited

U.S. PATENT DOCUMENTS 7,259,678 B2    8/2007  Brown et al.
8,936,197 B2    1/2015  Tiedmann et al.
(Continued)

FOREIGN PATENT DOCUMENTS

CN      1890425      1/2007
CN    102667824      9/2012
(Continued)

OTHER PUBLICATIONS

International Search Report and Written Opinion of ISA/EPO dated Nov. 23, 2018 prepared for PCT/IB2018/056276.
(Continued)

*Primary Examiner* — Fabricio R Murillo Garcia (57) ABSTRACT

Durable fabric RFID labels are provided for mounting on garments, fabrics and other fabric-containing items, the mounting and durability being before, during or after manufacturing and processing of the items. These labels are robust enough to withstand processing during manufacturing, while being capable of remaining on the item during inventory handling, merchandising and consumer use, including washing and drying. The durable labels include an RFID inlay, a face sheet overlying a first face of the RFID inlay, and a functional adhesive, such as a hot-melt adhesive, overlying a second face of the RFID inlay. The face sheet can be of printable material or have indicia or be a printed face sheet. The functional adhesive can be of a moisture-resistive type. The RFID inlay can be encased within a pocket of polymeric material. A polymeric sheet reinforcement layer can be adhered to and cover all or a portion of the RFID inlay.

18 Claims, 4 Drawing Sheets

(51) Int. Cl.
*G06K 19/077* (2006.01)
*G08B 13/24* (2006.01)
*G08B 21/02* (2006.01)
*G09F 3/02* (2006.01)

(52) U.S. Cl.
CPC ..... *G08B 13/2445* (2013.01); *G08B 21/0275* (2013.01); *G09F 3/0297* (2013.01); *G09F 2003/0233* (2013.01); *G09F 2003/0282* (2013.01)

(58) Field of Classification Search
USPC ...................................................... 340/572.1
See application file for complete search history.

(56) References Cited

U.S. PATENT DOCUMENTS

| | | | |
|---|---|---|---|
| 9,064,197 B2 | 6/2015 | Tiedmann et al. | |
| 9,064,199 B2 | 6/2015 | Nitta | |
| 9,159,015 B2 | 10/2015 | Bielmann et al. | |
| 11,140,867 B2 | 10/2021 | Fregeau | |
| 2003/0136503 A1* | 7/2003 | Green | G06K 19/07758 |
| | | | 156/264 |
| 2008/0020189 A1 | 1/2008 | Hofmair et al. | |
| 2013/0127060 A1* | 5/2013 | Aboush | H01L 24/13 |
| | | | 257/773 |
| 2014/0103116 A1 | 4/2014 | Martin et al. | |
| 2014/0298921 A1* | 10/2014 | Surapaneni | G01L 25/00 |
| | | | 73/862.041 |
| 2016/0050999 A1* | 2/2016 | Atashbar | A42B 3/0466 |
| | | | 2/411 |
| 2020/0334511 A1 | 10/2020 | Schoening | |

FOREIGN PATENT DOCUMENTS

| | | |
|---|---|---|
| CN | 103548037 | 1/2014 |
| CN | 111832679 | 10/2020 |
| EP | 1706534 | 9/2009 |
| EP | 2502188 | 9/2012 |
| JP | 5709692 | 4/2015 |

OTHER PUBLICATIONS

International Preliminary Report on Patentability dated Feb. 27, 2020 issued in corresponding IA No. PCT/IB2018/056276 filed Aug. 20, 2018.

* cited by examiner

21=RFID Label
22=RFID Chip
23=Antenna
25=Face Sheet
26=Functional Adhesive
27=Release Layer
28=Layer of Polymer Material
28'=Layer of Polymer Material
29=Paper Substrate
30=Fabric Item

31=RFID Label
32=RFID Chip
33=Antenna
35=Face Sheet
35'=Face Sheet
36=Functional Adhesive
38=Layer of Polymer Material
39=Fabric Item

41=RFID Label
42=RFID Chip
43=Antenna
45=Face Sheet
45'=Face Sheet
46=Functional Adhesive
48=Layer of Polymer Material
49=Fabric Item

51=RFID Label
52=RFID Chip
53=Antenna
54 Thermoplastic Layers
54'Thermoplastic Layers
55=Face Sheet
55'=Face Sheet
56=Functional Adhesive
58=Layer of Polymer Material
58'=Layer of Polymer Material
59=Fabric Item

DURABLE RFID PRINTED FABRIC LABELS

CROSS REFERENCE TO RELATED APPLICATION(S)

The present application is a division of and claims priority from U.S. utility patent application Ser. No. 15/680,364 filed Aug. 18, 2017, now patented as U.S. Pat. No. 10,534,988 granted on Jan. 14, 2020, which is incorporated herein by reference in its entirety.

BACKGROUND

Field of the Disclosure

The present subject matter relates to merchandise tracking tags. More particularly, the present subject matter relates to assemblies employing wireless communication approaches such as radio frequency identification ("RFID") technology useful in the context of merchandise production, processing and merchandising, which functions as a security and/or identification tag in the form of an identification label, patch, decorative component or the like and especially suitable for clothing.

Description of Related Art

Devices incorporating wireless communication approaches including RFID technology are widely used for a variety of different applications, including inventory control, tracking, guard and security systems. Such systems are well known in the retail industry, including in connection with clothing inventory control and security from theft and other losses.

RFID devices may have a variety of integrated components, among them an RFID chip containing data such as an identification code for the type of product and/or product component, allowing for immediate electronic identification and tracking of the exact piece of goods associated with a unique identification code. Other components include an antenna electrically connected to the RFID chip, which is responsible for transmitting signals to and/or receiving signals from another RFID device, for example, an RFID reader system.

In one example, an RFID reader is associated with a point-of-sale location or check-out counter of a retail facility and detects the chip in a tag associated with a piece of goods, which can include the stock keeping unit (SKU) and register price of that item, as well as other specific identification indicia. In another example, an RFID-readable tag is attached to a piece of merchandise in a retail facility, which tags are scanned using an RFID reader to keep proper count of the product inventory and/or to be used as a security measure functioning as a so-called guard tag.

RFID devices and antennas associated with or forming a part of such devices are well known. RFID chips or tags are well known and can include antennas suitable for particular intended uses. For example, an RFID device can include RFID chip, tag or strap in electronic communication with one or more dipole form antenna, which can feature radiating elements, such as on either side of the chip, tag or strap, with each radiating element configured to facilitate antenna performance. In some circumstances, the antenna component takes the form of a hybrid loop-slot antenna or slot-loop hybrid antenna, at times referred to as a "sloop" antenna. A variation is a hybrid loop-aperture antenna, as generally known in the art.

Typical RFID devices of these general types are susceptible to damage and reduction or elimination of expected operability upon exposure to the conditions of industrial processing of clothing, components or other items or products, particularly those made of fabric material. At times herein, these are referred to as "fabric items." Such susceptibility can be experienced before, during and/or after manufacturing and processing and subsequent warehousing, merchandising, use and handling by consumers. Included are industrial-type washing and other processing of fabric clothing and/or components, including denim items, as well as home laundering and wear-and-tear during consumer use. For example, traditional RFID tags, labels and printed fabric labels are not durable in apparel applications regarding home laundry wash or industrial-type wash cycles. In addition, RFID tags fail in many apparel manufacturing processes such as denim stone wash or enzyme bleaching.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect or embodiment of the present disclosure, a durable or robust merchandise tag, strap, patch, label or the like, at times referenced herein as a "durable label," is of enhanced durability and is especially useful for a variety of different applications, including inventory control, tracking before, during and after manufacturing and processing, and consumer use, as well as in connection with guard and security systems.

In another aspect or embodiment, a durable label has an RFID inlay, with a face sheet overlying one face of the RFID inlay, the face sheet being printable material or the face sheet being pre-printed. A functional adhesive, such as a hot melt adhesive, overlies another face of the RFID inlay, with a release sheet positioned over the functional adhesive. The durable label further has one, two or three of the following features: (1) the functional adhesive is a moisture-resistive adhesive; (2) the RFID inlay is encased within a pocket of polymeric material; and/or (3) a polymeric reinforcement layer is adhered to and covers all or some of the RFID inlay.

In a further aspect or embodiment, a durable label has an RFID inlay, with a face sheet overlying one face of the RFID inlay, the face sheet being printable material or the face sheet being pre-printed, and with a functional adhesive overlying another face of the RFID inlay. The functional adhesive is a moisture-resistive adhesive which in one embodiment is curing reactive. For example, the functional adhesive can be a one-component polyurethane-based adhesive.

In an additional aspect or embodiment of this disclosure, a durable label has an RFID inlay, with a face sheet overlying one face of the RFID inlay, the face sheet being printable material or the face sheet being pre-printed, and with a functional adhesive overlying the other face of the RFID inlay. The durable label is configured and formulated to be secured to a fabric item and further has one, two or three of the following features: (1) the functional adhesive is a moisture-resistive adhesive; (2) the RFID inlay is encased within a pocket of polymeric material; and/or (3) a polymeric reinforcement layer is adhered to and covers some or all of the RFID inlay.

In yet an added aspect or embodiment of the present disclosure, a durable label is secured to a fabric item, with the durable label of this combination having an RFID inlay. A face sheet overlies one face of the RFID inlay, with the face sheet being printable material or the face sheet being pre-printed, and with a functional adhesive overlying the other face of the RFID inlay. The durable label of the combination further has one, two or three of the following features: (1) the functional adhesive is a moisture-resistive adhesive; (2) the RFID inlay is encased within a pocket of polymeric material; and/or (3) a polymeric reinforcement layer is adhered to and covers all or some of the RFID inlay.

In accordance with a further aspect or embodiment, a durable label is secured to a fabric item, with the durable label of this combination having an RFID inlay. A face sheet overlies one face of the RFID inlay, with the face sheet being printable material or the face sheet being pre-printed, and with a functional adhesive overlying another face of the RFID inlay. The durable label of the combination is secured to the fabric item by functional adhesive that is a moisture-resistive adhesive. For example, the functional adhesive can be a one-component polyurethane-based adhesive.

Under a further aspect or embodiment, a durable label is secured to a fabric item, with the durable label of this combination having an RFID inlay. A face sheet overlies one face of the RFID inlay, with the face sheet being printable material or the face sheet being pre-printed, and with a functional adhesive overlying another face of the RFID inlay of this durable label of the combination, which RFID inlay is encased within a pocket of polymeric material.

In an added aspect or embodiment of the present disclosure, a durable label is secured to a fabric item, with the durable label of this combination having an RFID inlay. A face sheet overlies one face of the RFID inlay, with the face sheet being printable material or the face sheet being pre-printed with selected indicia for the particular fabric item. A polymeric reinforcement layer is adhered to and covers some or all of the RFID inlay, with a typical RFID inlay including a chip, an antenna, and integrated circuitry therefor.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The durable labels and RFID fabric labels disclosed herein are both robust and washable and are of relatively low thickness and exhibit a degree of flexibility suitable for clothing and other fabric item uses. Having these properties, the durable labels are especially suitable for use as labels, patches, tags, decorative overlays, printed fabric labels and the like for fabric items including garments and other wearables. Garments and other fabric items can be subjected to processing, including washing, so-called "stone washing" for denim and the like, and/or chemical treatment such as enzyme bleaching, during their processing or production. When thus used, the durable labels of this disclosure are robust and durable, including with respect to potential breakage of the RFID inlay components such as an antenna conductor.

The RFID devices of the present disclosure are capable of withstanding washing and other processes without having to incorporate material that adds excessive thickness, which would make the tags stiffer than desired, also impacting garment wearability. For example, this form of RFID label is well suited to inclusion in all forms of patches or other heat-applied, sonic-applied or adhesive-applied structures. The RFID labels described herein are useful as printed fabric labels or other embellishments such as decorative components that are intended to stay with the garment or other fabric items during all stages of manufacture, merchandising and consumer use. This allows, inter alia, improved processing and/or inventory control that increases production and merchandising efficiency while presenting a durable, attractive and minimally intrusive labeling approach.

It will be appreciated that the present RFID labels provide enhanced protection against chemical and mechanical damage when incorporated onto or into fabric items, such as garments, clothing or other fabric or sheet stock items. Typical examples of processes include washing, dyeing, stone washing, bleaching and drying, whether during manufacturing or by users of the fabric items. These types of processes can be part of the manufacturing process, and some or all may occur when the fabric items are in use.

The present RFID labels address a number of problems. One problem is disruption of the antenna conductor by breakage, cracking, tearing or attack by water or other chemical substance to which they are exposed during manufacturing, processing and/or consumer use. Other problems that are addressed are concerns about the disruption of the joint between the antenna and the RFID chip. In some cases, a strap or interposer is used, and the present approach addresses the problem of damage to the connection between the RFID chip and the strap, as well as damage to the connection between the strap and antenna joints. Furthermore, the present approach addresses concerns of physical damage to the RFID chip, such as cracking or crushing of the silicon structure. The various structures disclosed herein are effective in reducing the above-noted problems, concerns and potential damage.

The present disclosure involves three levels of enhancement to standard RFID products to pass all or some of the difficulties encountered during problem wash cycles and other harsh processing. A first enhancement is inclusion of a lamination adhesive that will adhere together layers of an RFID device or fabric item such as a printed fabric label for the life of garment processing, industrial wash and home wash cycles, drying cycles and other processing for the life of the garment (traditionally at least 25 wash cycles). A second enhancement involves encapsulation of the RFID elements into a water-proof flexible pouch to protect the antenna and chip from corrosive detergents, for example. A third enhancement involves reinforcement of the UHF/HF/NFC chip or strap attachment from excessive mechanical stress. Utilization of each enhancement separately, or in any combination of two enhancements, or all enhancements together provides the required level of durability for the aforementioned manufacturing, processing, merchandising and customer applications.

These advantages are achieved without modifying standard RFID inlays to address these challenges. In a general sense, which one or ones of the three enhancements are to be applied to provide a particular durable label or fabric item can be expected to vary depending on the severity of the conditions expected for the particular inlay and product or item within which is it associated or to which it is secured. Particular application for the technology of this disclosure is for flexible printed labels (or PFL's), but application also is suitable for standard labels and tags as well.

Figure 1:
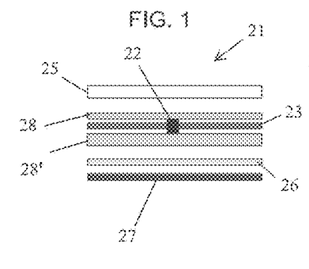
FIG. 1 is a schematic illustration of a first label construction embodiment according to the present disclosure.

FIG. 1 illustrates an RFID label, generally designated as 21, which includes an RFID inlay with RFID chip 22 and antenna 23, typically also having integrated circuitry and various adhesive connections that are affected by liquids and mechanical stresses, such as bending and compression. The RFID chip 23 and antenna are electrically coupled by integrated circuitry, such as by way of respective points of contact, in accordance with construction details and materials as known in the art. RFID chips can be variously configured in accordance with the particular application, for example including an integrated circuit for controlling RF communication and other functions of the RFID device.

The traditional RFID tags and labels are typically used in static simple environmental conditions. That said, apparel and industrial tracking business and customers utilizing RFID technology at times require expanding the technology upstream and downstream in the supply chain in addition to traditional retail store or shipping inventory counting applications. For example, RFID capabilities can be required at the start of a production cycle, and/or they can continue to operate as long as the garment may be utilized in its life cycle, such as through at least 25 wash and dry cycles. These uses add stresses and environmental conditions that will degrade the RFID inlay or cause the product to fail before its intended purposes have been completed.

RFID label 21 illustrates a "two-pass" label construction having an outside layer, or face sheet 25, that is printable or printed upon with indicia such as marketing messaging, product or item identification, manufacturing and materials disclosure information, sizing, decoration, logo, and so forth. This sheet typically will be a material in the fabric genre, for example polymeric-including or polymeric-based fabric, such as woven polyester, woven nylon, filled and blended fabric, and the like. RFID label 21a of FIG. 1A and RFID label 21b of FIG. 1B also include this face sheet 25.

Figure 1A:
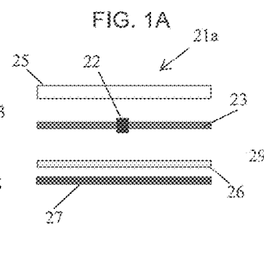
FIG. 1A is a schematic illustration of a second label construction embodiment according to the present disclosure.
Figure 1B:
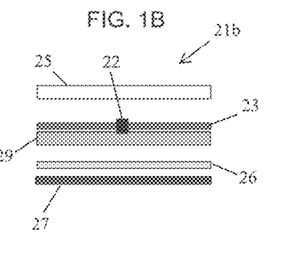
FIG. 1B is a schematic illustration of a third label construction embodiment according to the present disclosure.
Figure 1C:
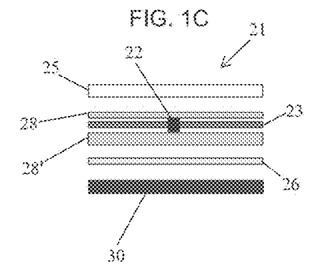
FIG. 1C is a schematic illustration of the embodiment of FIG. 1, further including a fabric item.
Figure 1D:
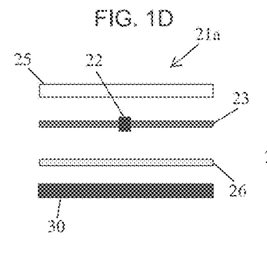
FIG. 1D is a schematic illustration of the embodiment of FIG. 1A, further including a fabric item.
Figure 1E:
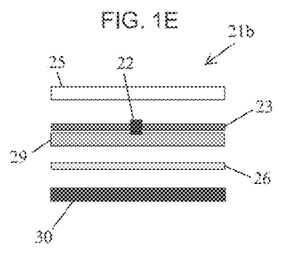
FIG. 1E is a schematic illustration of the embodiment of FIG. 1B, further including a fabric item.

Further, each of FIG. 1, FIG. 1A and FIG. 1B illustrate a functional adhesive 26 protected by a release liner 27 that is removed prior to affixing the RFID label 21, 21a, 21b to a garment, fabric item or other product or component to which the durable label is to be secured (as in FIG. 1C, FIG. 1D and FIG. 1E). The RFID label 21 of FIG. 1 has a second-pass component that is a layer of polymer material on either side of the RFID inlay, shown as layers 28 and 28', which can be two individual or separate pieces, such as two sheets, or alternatively a single sheet forming both layers. These polymer layers typically are made of a polyester, for example polyethylene terephthalate (or PET). For clarity and ease of understanding, FIG. 1, and all drawings of this disclosure, show their various layers and/or components separated; however, it will be appreciated by those of ordinary skill that the RFID label will be an assembly of these sheets and layers in direct engagement with each adjacent layer or sheet, typically joined by following lamination procedures using lamination equipment such as by way of nip roller action.

FIG. 1A illustrates another embodiment of an RFID label 21a, this employing a low-cost LCSF single pass approach, wherein the RFID inlay directly engages the face sheet 25 and the functional adhesive 26. The antenna assembly used for this LCSF single pass approach can be formed of aluminum, rather than including any polyester (e.g. PET), such as a layer corresponding to layers 28, 28' of the FIG. 1 embodiment.

FIG. 1B illustrates another embodiment of an RFID label 21b, this employing a DCSF single pass approach, wherein the RFID inlay directly engages the face sheet 25, but not the functional adhesive 26. The antenna used for this DCSF single pass approach includes a thin film of polyester, e.g. PET, (not shown) as part of the antenna raw material (along with aluminum) and is included in the antenna shape. Rather than directly engaging the functional adhesive 26 (as in the embodiment of FIG. 1A), a paper substrate 29 may be positioned between the antenna 23 and the functional adhesive 26.

RFID labels 21, 21a and 21b each constitute printed fabric labels that are laminated and include a functional adhesive 26 that is a standard functional adhesive, which in one embodiment contemplated by the present invention is a type of hot melt adhesive, being a moisture-resistive adhesive. The present invention contemplates that the moisture resistive adhesive in one embodiment may be curing-reactive, but is not limited to being curing-reactive. Typically, hot melt adhesives begin to delaminate after ten to fifteen wash cycles. functional adhesives are characterized by being solid systems that do not require either moisture for application or moisture removal for setting. According to the present disclosure, the functional adhesive component is of a type falling in the family of one-component, moisture-curing reactive polyurethane functional adhesives. Such functional adhesives require humidity or water vapor to initiate the reaction of the chemical composites of the adhesive in order to cure. These achieve a durability in excess of thirty wash-and-dry cycles. One hot melt adhesive contemplated by the present invention is moisture-curing, has a higher humidity increases curing speed, and the adhesive prior to use is, in one embodiment, protected against humidity exposure. With these types of adhesives, linkage to the woven fabric fibers of the face material with the adhesive achieves the cross-linkage providing the permanent bond effect that is characteristic of the first enhancement of the present disclosure.

FIG. 1C is a schematic illustration of the embodiment of FIG. 1 when combined with a fabric item 30 associated with the RFID label 21. This shows the combination of the RFID label secured to the fabric item. The release liner 27 of the corresponding label is omitted from FIG. 1C, same having been removed before the functional adhesive 26 adhesively secures the durable RFID label 21 to the fabric item 30. As with other views in this disclosure, the functional adhesive is shown separated from the fabric item for purposes of drawing clarity, and it will be understood there is no separation when the durable RFID label is adhesively secured to the fabric item.

FIG. 1D is a schematic illustration of the embodiment of FIG. 1A when combined with a fabric item 30 associated with the RFID label 21a. This shows the combination of the RFID label secured to the fabric item. The release liner 27 of the corresponding label is omitted from FIG. 1D, same having been removed before the functional adhesive 26 adhesively secures the durable RFID label 21a to the fabric item 30. As with other views in this disclosure, the functional adhesive is shown separated from the fabric item for purposes of drawing clarity, and it will be understood there is no separation when the durable RFID label is adhesively secured to the fabric item.

FIG. 1E is a schematic illustration of the embodiment of FIG. 13 when combined with a fabric item 30 associated with the RFID label 21b. This shows the combination of the RFID label secured to the fabric item. The release liner 27 of the corresponding label is omitted from FIG. 1E, same having been removed before the functional adhesive 26 adhesively secures the durable RFID label 21b to the fabric item 30. As with other views in this disclosure, the functional adhesive is shown separated from the fabric item for purposes of drawing clarity, and it will be understood there is no separation when the durable RFID label is adhesively secured to the fabric item.

Figure 2:
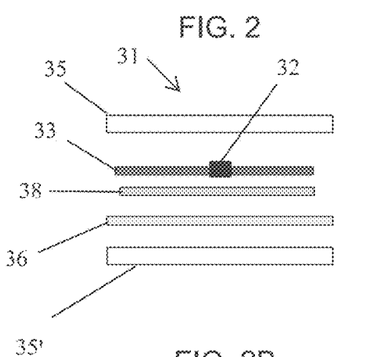
FIG. 2 is a schematic illustration of an embodiment of a printed fabric label according to the present disclosure.
Figure 2A:
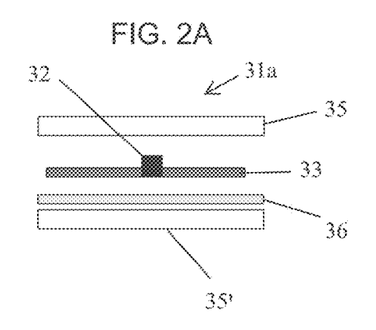
FIG. 2A is a schematic illustration of an embodiment of a printed fabric label of a "smart face" type according to the present disclosure.
Figure 2B:
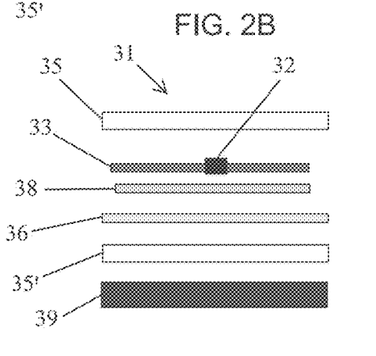
FIG. 2B is a schematic illustration of the embodiment of FIG. 2, further including a fabric item.
Figure 2C:
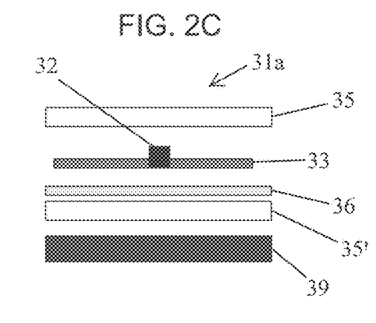
FIG. 2C is a schematic illustration of the embodiment of FIG. 2A, further including a fabric item.

Other embodiments of durable RFID labels are illustrated in FIG. 2 and FIG. 2A, each in combination with a fabric item being shown in FIG. 2B and FIG. 2C, respectively. FIG. 2 shows an RFID label, generally designated as 31. An RFID inlay having an RFID chip 32 and antenna 33 as generally discussed herein, with face sheets 35, 35' and a lamination or functional adhesive 36 as discussed regarding FIG. 1 between face sheet 35' and a polymer layer 38 are included in this embodiment. The polymer layer 38 typically is a polyester or contains a polyester, such as PET, providing what can be identified in the art as a PET-based printed fabric label embodiment. FIG. 2A illustrates a so-called "smart face" printed fabric label embodiment which generally follows the FIG. 2 embodiment, but does not contain any polymer/polyester/PET type layer 38 of FIG. 2.

FIG. 2B is a schematic illustration of the durable RFID label embodiment of FIG. 2 when combined with a fabric item 39 associated with the RFID label 31. For this combination, the RFID label is shown secured to the fabric item. Securement in this context can include attachment of the RFID label to the garment by adhesive, sew-in technology, placement of brads or other approaches, whether the attachment is throughout the entire extent of a surface of the RFID label, is along all or a portion of the perimeter of the surface of the RFID label, or results in tacking of the RFID label to the fabric item. Which securement option is utilized, and whether or not the securement is intended to be permanent or intentionally removable, will depend on the fabric item and the designated or intended function of the RFID label during manufacture, marketing and consumer use. As with other views in this disclosure, the face sheet is shown separated from the fabric item for purposes of drawing clarity, and it will be understood there is no separation when the durable RFID label is secured to the fabric item.

FIG. 2C is a schematic illustration of the durable RFID label embodiment of FIG. 2A when combined with a fabric item 39. For this combination, the RFID label is shown secured to the fabric item, securement being as described with respect to the FIG. 2B RFID label and fabric item combination.

Figure 3:
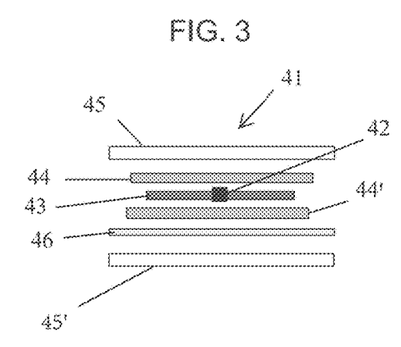
FIG. 3 is a schematic illustration of a printed fabric label including an RFID encapsulation or pocket feature according to a further embodiment of the present disclosure.
Figure 3A:
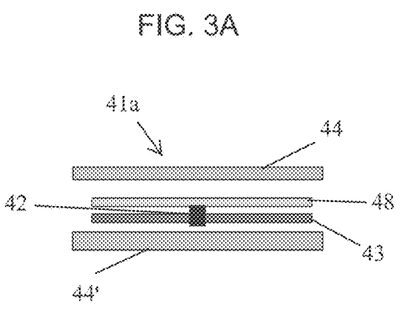
FIG. 3A is a schematic illustration of an RFID encapsulated or pocket feature of a sew-in pocket feature according to the present disclosure.

FIGS. 3 and 3A illustrate embodiments that include the polymeric pocket encasement enhancement feature. In connection with the present disclosure, prevention of liquid ingression to the RFID elements is a characteristic of the present disclosure and also is a characteristic of these embodiments, to assure enhanced life and continued acceptable performance of garments or other fabric items when subjected to the types of conditions discussed herein. Traditional adhesives that are not according to the present disclosure and traditional lamination methods do not provide the bonding protection from the temperature and mechanical stresses that would be typically encountered by fabric items in the category of the present disclosure, for example several up to 60° C. wash cycles and several up to 90° C. dry cycles. FIG. 3 shows an RFID label, generally designated as 41, while FIG. 3A shows an RFID label, generally designated as 41a.

In accordance with these FIG. 3 and FIG. 3A embodiments, effective encasement of the RFID inlay within a waterproof pocket is achieved through permanent melt bonding, sealing or welding of two layers of thermoplastic material, referenced herein as pocket encasement layers 44, 44'. Bonding of such layers together, with the RFID components permanently encased inside, protects against ingression of moisture. These encasements typically are most efficiently prepared by processing in roll-to-roll form on a continuous basis, incorporating roll nip action, in which waterproof pockets can then be delivered as die cut packets to be inserted into the lamination process as discussed herein for insertion into or combining as pockets with apparel or other fabric items. For example, in a roll-to-roll manufacturing process, a layer of the thermoplastic material has the RFID inlays inserted across and down the sheet web and then proceeds with forming a final laminate of the second layer to the first layer, and then die cuts out the final waterproof pockets with a steel rule die cutter. Specific conditions, such as temperature, pressure and residence time in the laminating nip and heating rollers, for example, will vary depending on the particular thermoplastic material or materials forming the pocket.

Included in such thermoplastic materials are thermoplastic polyurethane (TPU), polyethylene terephthalate glycol (PETG), polyethylene terephthalate (PET), ethylene vinyl acetate (EVA), high-density polyethylene (HDPE), blends thereof, multi-layered components thereof, and combinations thereof. One specific example of a blended combination is EVA and HDPE. Specific examples of multi-layered embodiments include bondable films such as combinations of PET-TPU and/or PET-EVA. Compatibility for blending and/or multi-layering, or compatibility of combinations of differing ones of these thermoplastic materials as between the layers will generally be appreciated in the art. Such compatibility takes into consideration the degree of thermodynamic miscibility of the differing materials.

With further reference to the waterproof pocket embodiments, such as the durable labels, generally designated as 41, 41a in FIG. 3 and FIG. 3A, respectively, have an RFID inlay with an RFID chip 42 and antenna 43 as generally discussed herein, with face sheets 45, 45', together with (in the embodiment of FIG. 3) a lamination or functional adhesive 46 as discussed regarding FIG. 1 and other embodiments. With FIG. 3 and FIG. 3A, the RFID inlay is within a pocket encasement having layers 44, 44', which can be two individual or separate pieces, such as two sheets, or alternatively a single sheet forming both layers. In the FIG. 3 embodiment, these thermoplastic pocket encasement layers are between face sheets 45, 45', and the functional or lamination adhesive 46 joins the thermoplastic pocket to the face sheet or sheets. Further, the adhesive can join the face sheets 45, 45' together as desired. FIG. 3A illustrates an embodiment where the RFID inlay is fused between the thermoplastic layers 44, 44' and includes a layer 48 of polymeric material such as PET overlying one or both surfaces of the RFID inlay. This embodiment can be especially suitable for approaches where the pocket encasement is sewn into the fabric item, such as under a patch or inside a garment seam.

Figure 3B:
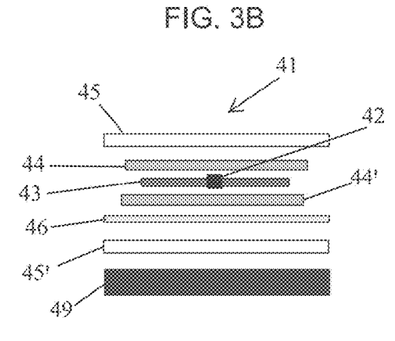
FIG. 3B is a schematic illustration of the embodiment of FIG. 3, further including a fabric item.

FIG. 3B is a schematic illustration of the durable RFID label embodiment of FIG. 3 when combined with a fabric item 49 associated with the durable RFID label 41. For this combination, the RFID label is shown secured to the fabric item. Securement in this context can include attachment of the RFID label to the garment by adhesive, sew-in technology, placement of brads or other approaches, whether the attachment is throughout the entire extent of a surface of the RFID label, is along all or a portion of the perimeter of the surface of the RFID label, or results in tacking of the RFID label to the fabric item. Which securement option is utilized, and whether or not the securement is intended to be permanent or intentionally removable, will depend on the fabric item and the designated or intended function of the RFID label during manufacture, marketing and consumer use. As with other views in this disclosure, the face sheet is shown separated from the fabric item for purposes of drawing clarity, and it will be understood there is no separation when the durable RFID label is secured to the fabric item.

Figure 3C:
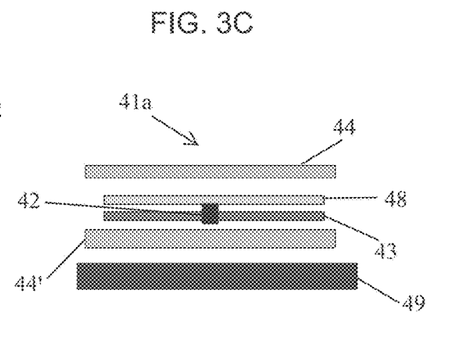
FIG. 3C is a schematic illustration of the embodiment of FIG. 3A, further including a fabric item.

FIG. 3C is a schematic illustration of the durable RFID label embodiment of FIG. 3A when combined with a fabric item 49. For this combination, the RFID label is shown secured to the fabric item, securement being as described with respect to the FIG. 3B RFID label and fabric item combination.

Figure 4:
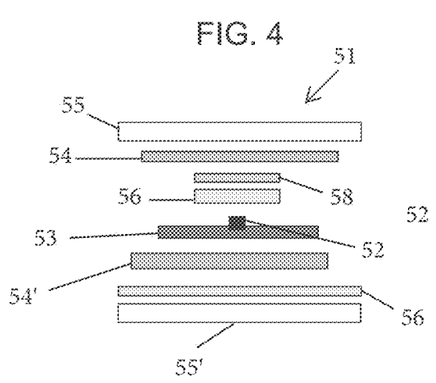
FIG. 4 is a schematic illustration of a printed fabric label including a reinforcement layer for the RFID inlay according to a further embodiment of the present disclosure.
Figure 4A:
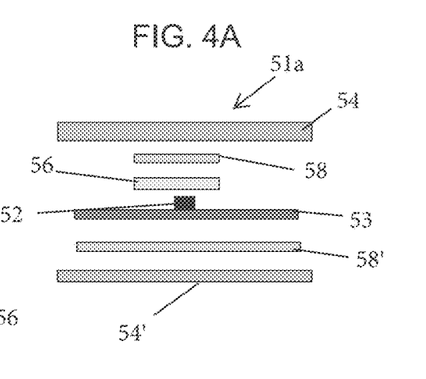
FIG. 4A is a schematic illustration of an embodiment of the present disclosure including reinforcement adhesive-laminated to the RFID inlay.

Durability reinforcement enhancement embodiments of the present disclosure assure a life for the durable label of the fabric items for a minimum of twenty-five wash-and-dry cycles and their attendant mechanical bending and stretch-and-compression actions. Rigid reinforcement of the RFID inlay is, for most applications for fabric items, unacceptable for apparel "look" and for physical "feel" requirements. Previously proposed or practiced highly flexible over-laminates provide minimal protection. The embodiments hereof including durability reinforcement enhancement of these embodiments or including when combined with other enhancement embodiments as described herein provide necessary protection of RFID functionality, for the intended life of the fabric item, such as a garment, piece of clothing, accessory or non-clothing fabric item. Embodiments relevant to same are illustrated in FIG. 4 and FIG. 4A. These particular embodiments are shown with an option of a pocket encasement structure as generally discussed with respect to FIG. 3 and FIG. 3A.

This durability reinforcement enhancement feature provides the RFID labels, generally designated as 51 and 51a in FIGS. 4 and 4A, respectively, by an approach that directly protects the RFID chip 52, and key areas of the RFID antenna 53, or other components associated with the RFID inlay, as desired. Achieving this durability reinforcement enhancement includes a layer 58 of polymeric material such as PET overlying one or both surfaces of the RFID inlay. Specifically, in the FIG. 4 and FIG. 4A embodiments, a resistive functional adhesive 56, which may be of the type discussed herein with respect to FIG. 1 and other embodiments, secures the polymeric sheet layer 58 to at least one face of the RFID inlay to fully cover the RFID chip 52. For example, the layer 58 can be in the form of a disc to extend beyond the perimeter of a generally circular RFID chip. In FIG. 4A, a further layer 58' of polymeric material such as PET overlies an opposite face of the full RFID inlay, including both the RFID chip and RFID antenna.

Concerning the pocket encasement structure shown as a component in each of FIG. 4 and FIG. 4A, the RFID inlay is within a pocket encasement having layers 54, 54', which can be two individual or separate pieces, such as two sheets, or alternatively a single sheet forming both layers. In the FIG. 4 embodiment, these thermoplastic pocket encasement layers are between face sheets 55, 55', and the functional or lamination adhesive joins the thermoplastic pocket to the face sheet or sheets, and can join the face sheets 55, 55' together as desired. FIG. 4A illustrates an embodiment where the RFID inlay and its associated durability reinforcement enhancement that includes layers 58, 58' of polymeric material fused between the thermoplastic layers 54, 54'.

FIG. 4 is an embodiment of reinforced thermoplastic polyurethane (TPU) as a durable printed fabric label with a single reinforcing polymer layer as discussed herein (e.g. PET) disc. FIG. 4A is an embodiment of reinforced thermoplastic polyurethane as a durable printed fabric label with a pair of reinforcing polymer layer (e.g. PET) discs. The disc reinforcement may be adhesive-laminated to the RFID inlay and antenna, as in the embodiment of FIG. 4 or, as in the FIG. 4A embodiment, the RFID inlay may be heat fused between two TPU layers.

Figures 4B, 4C:
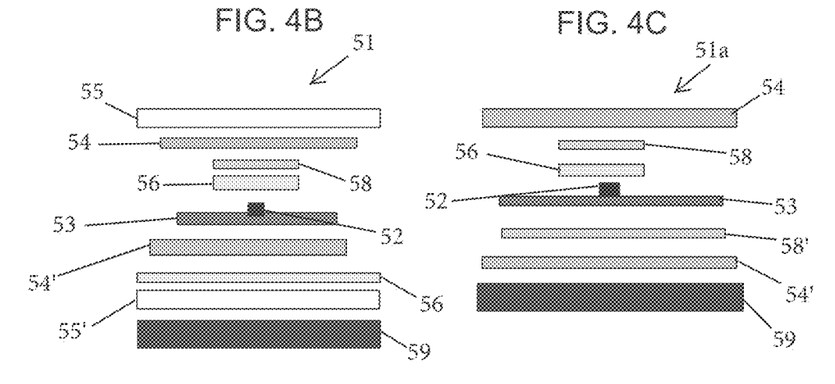
FIG. 4B is a schematic illustration of the embodiment of FIG. 4, further including a fabric item.
FIG. 4C is a schematic illustration of the embodiment of FIG. 4A, further including a fabric item.

FIG. 4B is a schematic illustration of the durable RFID label embodiment of FIG. 4 when combined with a fabric item 59 associated with the durable RFID label 51. For this combination, the RFID label is shown secured to the fabric item. Securement in this context can include attachment of the RFID label to the garment by adhesive, sew-in technology, placement of brads or other approaches, whether the attachment is throughout the entire extent of a surface of the RFID label, is along all or a portion of the perimeter of the surface of the RFID label, or results in tacking of the RFID label to the fabric item. Which securement option is utilized, and whether or not the securement is intended to be permanent or intentionally removable, will depend on the fabric item and the designated or intended function of the RFID label during manufacture, marketing and consumer use. As with other views in this disclosure, the face sheet is shown separated from the fabric item for purposes of drawing clarity, and it will be understood there is no separation when the durable RFID label is secured to the fabric item.

FIG. 4C is a schematic illustration of the durable RFID label embodiment of FIG. 4A when combined with a fabric item 59 associated with the RFID label 51a. For this combination, the RFID label is shown secured to the fabric item, securement being as described with respect to the FIG. 3B RFID label and fabric item combination.

It will be appreciated, with the durability reinforcement enhancement feature such as illustrated in FIGS. 4 and 4A, coverage of the RFID inlay with polymeric material layers 58, 58' is strategically designed from, for example, simple spot coverage to full coverage of the RFID inlay or partial coverage thereof to achieve desired results for various possible RFID inlay designs, configurations and structures. For example, the strategic design will vary among the various radiofrequency (RF) frequencies of UHF, HF or NFC. Also, thickness of the polymeric material layers 58, 58' can vary depending on the specifics of an RFID inlay and the intended application. Typical thickness ranges are between about 0.004 Inch and about 0.04 inch, between about 0.005 inch and about 0.03 inch, between about 0.007 inch and about 0.02 inch, or between about 0.008 inch and about 0.01 inch.

Other embodiments, besides those illustrated herein, may also be employed without departing from the scope of the present disclosure. For example, other means for attaching the RFID label to a garment or other fabric item or otherwise bendable material can be employed, such as sewing, brads or other connection mechanisms. Further, RFID inlay configuration variations may be employed. Relative sizes of layers can vary in accordance with intended uses, including variation in area of face sheets so as to extend fully beyond interior components and variation in area of application of the functional or lamination adhesive to secure multiple components together.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A durable fabric radio frequency identification (RFID) label comprising:
    an RFID inlay having a first face, a second face, and an antenna;
    a polymeric sheet reinforcement layer adhered to and covering at least a portion of the RFID inlay and at least a portion of the antenna; and
    a functional adhesive overlying the second face of the RFID inlay and at least a portion of the antenna, wherein the functional adhesive is a moisture-resistive moisture-curing reactive polyurethane functional adhesive.

2. The durable label in accordance with claim 1, wherein the functional adhesive is a one-component polyurethane-based adhesive.

3. The durable label in accordance with claim 1, further including a release layer overlying the functional adhesive.

4. The durable label in accordance with claim 1, wherein the face sheet is of a printable material or has an exposed face with indicia.

5. The durable label in accordance with claim 1, further including a polymeric sheet between the face sheet and the first face of the RFID inlay.

6. The durable label in accordance with claim 1, further including a polymeric sheet between the functional adhesive and the second face of the RFID inlay.

7. The durable label in accordance with claim 1, wherein the RFID inlay is encased within a pocket of polymeric material.

8. The durable label in accordance with claim 7, wherein the polymeric material is at least one of a blend, multi-layered component and/or a combination from the group consisting of thermoplastic polyurethane, polyethylene terephthalate, polyethylene terephthalate glycol, ethylene vinyl acetate and high-density polyethylene, blends thereof, multi-layered components thereof, and combinations thereof.

9. A combination of a durable label secured to a fabric item, comprising:
    a label comprising
        a radio frequency identification (RFID) inlay having a first face, a second face, and an antenna;
        a polymeric sheet reinforcement layer adhered to and covering at least a portion of the RFID inlay and at least a portion of the antenna; and
        a functional adhesive overlying the second face of the RFID inlay and at least a portion of the antenna, the functional adhesive being a moisture-resistive moisture-curing reactive polyurethane functional adhesive; and
    the fabric item durably secured to the label via the functional adhesive.

10. The combination in accordance with claim 9, wherein the face sheet is of a printable material or has an exposed face with indicia.

11. The combination in accordance with claim 9, wherein the polymeric sheet reinforcement layer is between the functional adhesive and the second face of the RFID inlay.

12. The combination in accordance with claim 9, wherein the RFID inlay is encased within a pocket of polymeric material.

13. The combination in accordance with claim 12, further including a polymeric sheet reinforcement layer positioned within the pocket.

14. A combination of a durable label secured to a fabric item, comprising:
    a label comprising
        a radio frequency identification (RFID) inlay having a first face, a second face, and an antenna and being encased within a pocket of thermoplastic material;
        a polymeric sheet reinforcement layer adhered to and covering at least a portion of the RFID inlay and at least a portion of the antenna; and
        a curable reactive functional adhesive overlying the second face of the RFID inlay and at least a portion of the antenna; wherein the functional adhesive is a moisture-resistive moisture-curing reactive polyurethane functional adhesive; and
    the fabric item durably secured to the label via the functional adhesive.

15. The combination in accordance with claim 14, wherein the face sheet is of a printable material or has an exposed face with indicia.

16. The combination in accordance with claim 14, wherein the polymeric sheet reinforcement layer is positioned within the pocket.

17. The combination in accordance with claim 14, wherein the securement includes sew-in technology or placement of brads.

18. The combination in accordance with claim 14, where the label has a perimeter, and the securement is along a portion of the perimeter.

\* \* \* \* \*